Oct. 10, 1939.    M. W. ALBANO    2,176,000
PORTABLE PHOTOGRAPHING AND DEVELOPING CAMERA
Filed Sept. 10, 1937    3 Sheets-Sheet 1
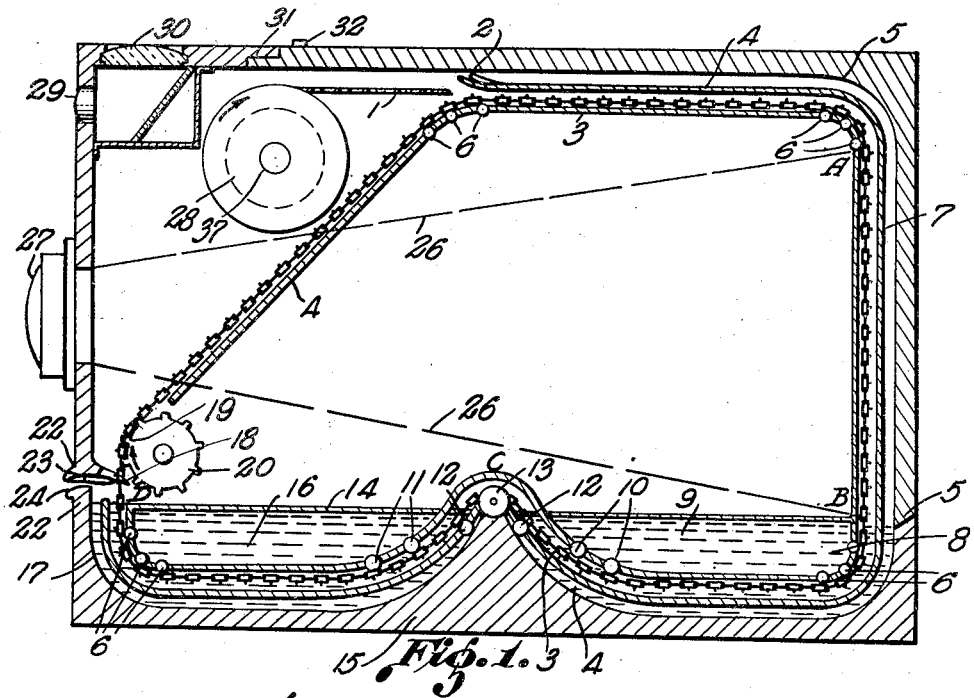
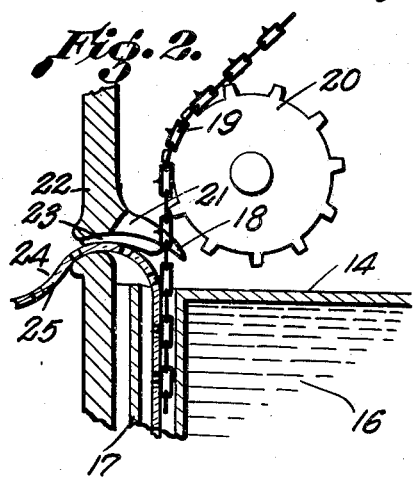
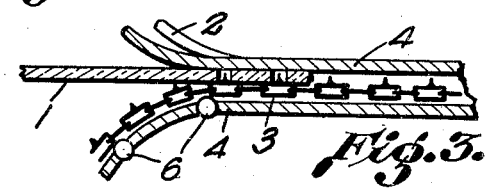
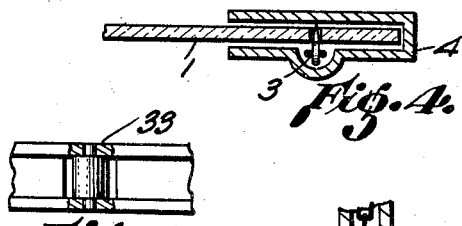
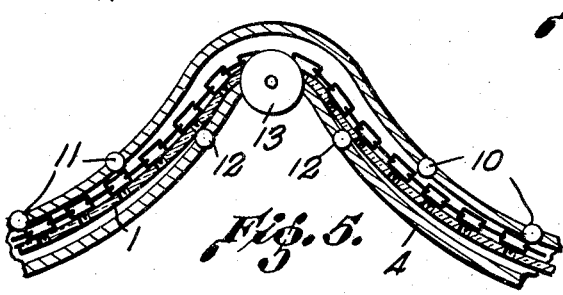
Inventor:
Michael W. Albano
by Walter C. Ross
Attorney Oct. 10, 1939.    M. W. ALBANO    2,176,000
PORTABLE PHOTOGRAPHING AND DEVELOPING CAMERA
Filed Sept. 10, 1937    3 Sheets-Sheet 2

Inventor:
Michael W. Albano
by Walter C. Ross
Attorney

Oct. 10, 1939.　　　M. W. ALBANO　　　2,176,000
PORTABLE PHOTOGRAPHING AND DEVELOPING CAMERA
Filed Sept. 10, 1937　　　3 Sheets-Sheet 3
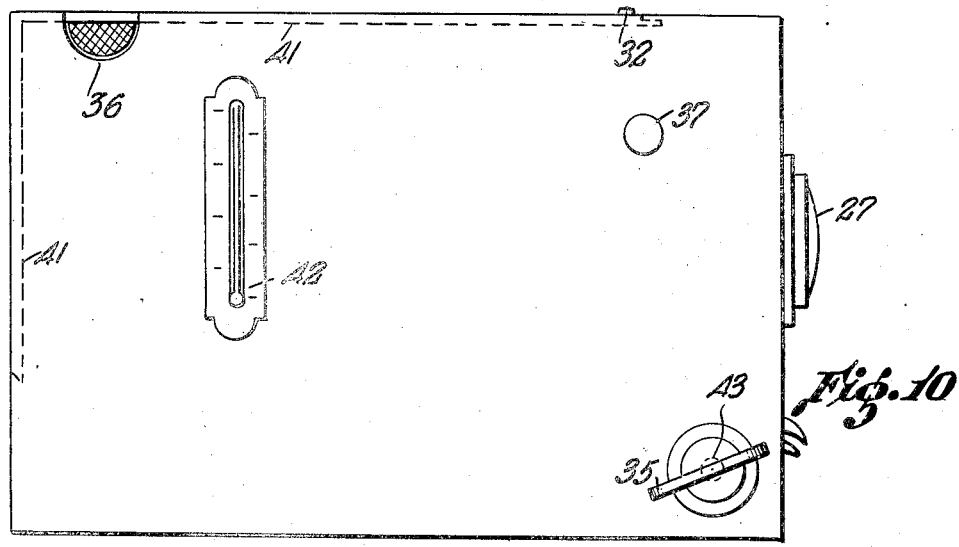
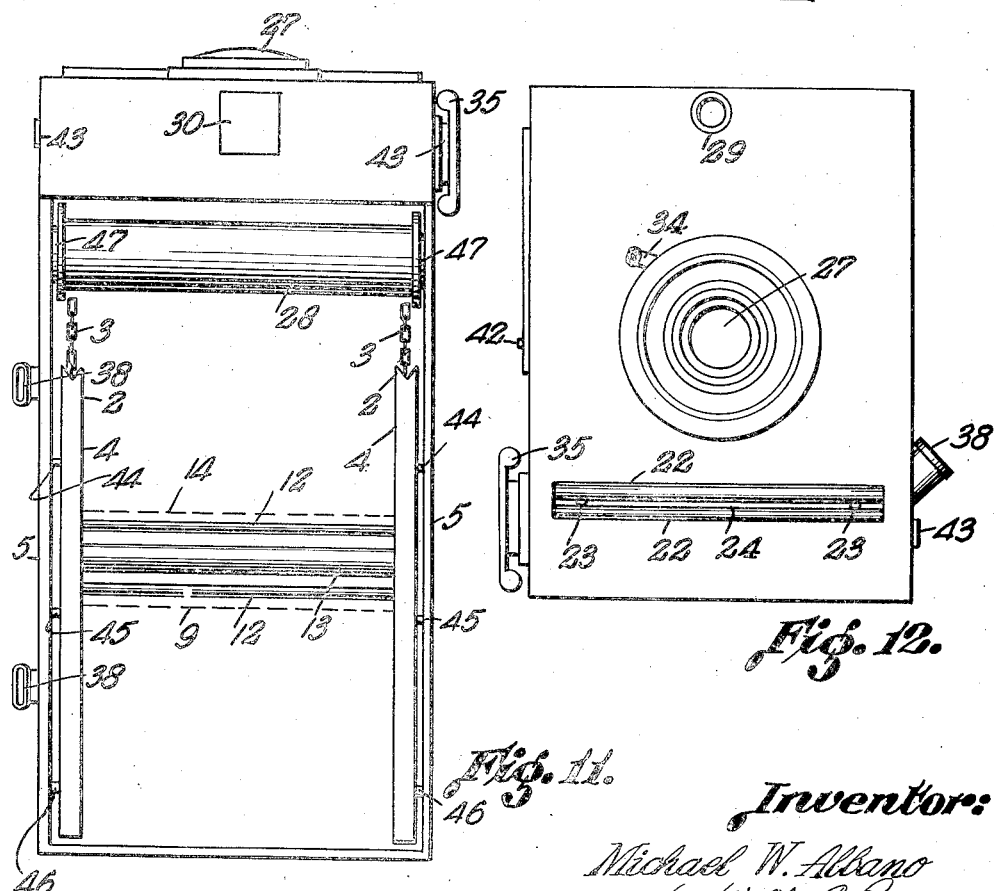
Inventor:
Michael W. Albano
by Walter C. Ross.
Attorney Patented Oct. 10, 1939

2,176,000

UNITED STATES PATENT OFFICE 2,176,000

PORTABLE PHOTOGRAPHING AND DEVELOPING CAMERA

Michael W. Albano, Springfield, Mass.

Application September 10, 1937, Serial No. 163,271

10 Claims. (Cl. 95—13)

The invention relates to improvements in automatic photographing and developing cameras.

An object of my invention is to provide a simple, economical, and portable camera which will take photographs, develop the same in the camera-box itself, and then eject the finished developed photograph automatically.

Broadly my invention will make possible the manufacture of a small portable camera which will take and develop pictures at the same time. Each picture necessitating approximately one to two minutes for developing and passing through the processes of the camera. The film is carried through the different processes and compartments of the camera by two small chains fitted in grooves attached to the sides of the camera. The mechanism is operated by hand.

A preferred form of my invention is illustrated in the accompanying drawings, in which:

Figure 1 is a cross-section view of the left lateral side of the camera, showing the operations inside the camera.

Figure 2 is an enlarged view of the process which ejects the finished photograph.

Figure 3 is an enlarged view showing how the film becomes attached to the chain and how it is carried along the groove.

Figure 4 is an enlarged cross-section view of a part of the film, chain, and groove.

Figure 5 is an enlarged view showing the process or mechanism which carries the film from one compartment to another.

Figure 6 is an enlarged view of a corner of the groove or trench showing the rollers which facilitate the travel of the chain thereon.

Figure 6a is a detail view of one of the rollers.

Figure 10 is a right lateral elevational view of the camera.

Figure 11 is a perspective view of the camera with the top removed.

Figure 12 is a front elevational view of the camera.

Referring now to the drawings in detail, in which like numerals refer to like parts throughout:

Figure 7:
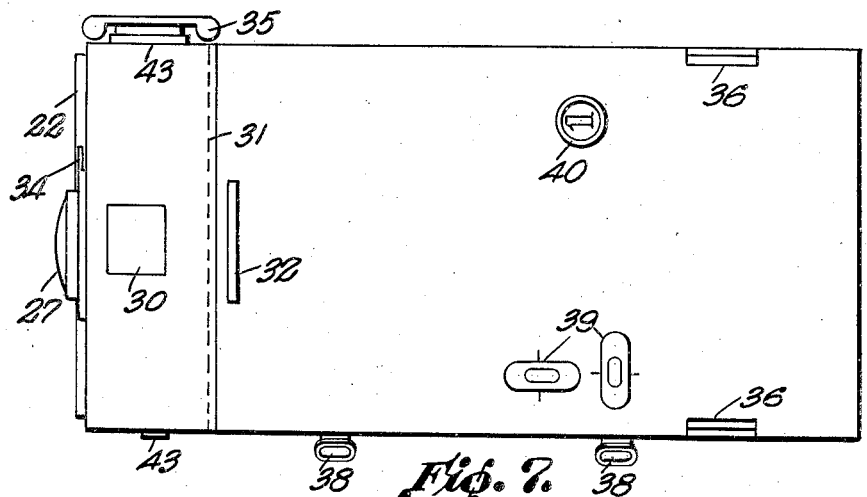
Figure 7 is a perspective view of the top of the camera.

Figure 1 is a cross-section view of the camera with the left side removed. Inside of the camera itself, attached to the two sides, are two metal grooves or trenches; each carrying a small chain. These grooves and chains operate through the camera in a circuitous motion or direction. The camera is operated by the hand, and the film travels in a counter clock-wise direction. In Figure 1, the view presented is that of the left side of the camera showing the chain, groove, and mechanism appearing on that side. In Figure 1 the chain and groove operate through the camera in a clock-wise direction, forming a complete circle. The film, indicated 1, is attached to the chain and enters the groove at point 2. The chain, driven by wheel 20, travels along the groove carrying the film to position 7. Here the film is exposed to the light and receives the photographic impression or image. From position 7, the film is carried by the chains into the developing solution tank indicated as 8. It is allowed to develop, and is then carried along the groove by the chain into the tank containing the water, designated as 16. It is then ejected automatically by the next operation, and comes out of the camera at points 22 22. The film used is called positive film. It is sometimes called positive paper. This takes the impression which is in turn developed by the solution in tank 8. The time required is approximately 60 to 120 seconds, depending on the temperature. The water in tank 16 stops the action of the developing solution.

Referring to Figure 1 in more detail, 27 is the lens. 26 26 is the cone-shaped part of the camera which carries the image to the film in position 7. The front part of this cone fits between the two driving chains and totally encloses the area it occupies. 28 is the roll of films and 37 is the axle on which the roll rotates. As the film travels along the groove it comes in contact with the rollers designated as 6. There are four sets of rollers, three in each set, found at four corners of the groove. These small rollers facilitate the motion of the chains carrying the film. 10 10 and 11 11 are rollers fitted into the groove itself. 12 12 and 13 are rollers which extend from one side of the camera to the other. The back of the film comes in contact with these rollers at these points (12 12 and 13). This also facilitates the travel of the chains and film along the groove. The film is ejected at 22 22. 24 is the space where it comes out. 18 is one of the two finger-like points which cause the film to be detached from the chain and pass out through 22 22. 23 is one of the two small rib-like metal pieces which keep the middle of the photograph from touching or being scratched by the ejector 22. The chain at point 19 continues in its circuitous motion along the groove up to point 2 again and completes the circle. The groove is designated at 4 throughout. At the point where the chain is entered on the groove it is designated as 3. The top and back of the camera, which becomes detached when it is necessary to load the film into the camera, is represented as 5 5. 31 and 31 represents the snap which allows the top to be removed, or put back in place. 29 and 30 represent the reflector which allows the image to be centered before the picture is snapped. 15 is the base of the camera. This is made of wood or metal and separates the two tanks. 17 is the edge of the tank near points 22 22. 9 and 14 are the tops of the tanks. The tanks are enclosed with the exception of the necessary openings where the grooves and film enter the respective tanks and go out.

The distances between points A and B, B and C, and C and D are equal. The films can either be exposed one after another, as each goes through each process of the camera, or the roll of films can be so constructed so that two blanks follow each film. This would allow a piece of film to be exposed, go through the two processes of the camera and be ejected before the next film is in a position to be exposed.

Figure 2 is an enlarged view of the mechanism of the point where the film is ejected; 20 being the wheel, 19 being the chain, and 18 being the finger or tongue-like point, which passes inside the chain and protrudes beyond, causing the film to become detached automatically as the chain continues its clock-wise motion. In Figure 2 the film is indicated as 25. 16 is the water tank, 14 the metal covering, and 17 the edge. 21 is the space between the two finger-like points. After the photograph is ejected, the chain then proceeds along its route on groove 4.

Figure 3 is an enlarged view of the point where the film becomes attached to the chain. Numeral 1 being the film, 2 is the fork which forces the film onto chain 3, and this travels along groove 4. The film will have slots cut into the sides; said slots fitting on the points of the chain. Each link of the chain having a pin-like point for the purpose of fitting into the slots on the sides of the film. In this way the film has no opportunity to slip and must follow along through the camera.

Figure 4 is an enlarged cross-section view of a part of the film, chain, and groove, and indicated as 1, 3, and 4 respectively.

Figure 5 shows the mechanism which carries the film from the tank containing the solution to the tank containing the water. Rollers 12 12, and roller 13 extend from one side of the camera to the other. Rollers 10 10, and 11 11, are like the rollers described in Figure 6; each being limited to the metal groove itself. This figure shows the film in the process of going from the tank containing the solution to the tank containing the water.

Figure 6 shows one of the set of three rollers found at four corners of each groove which facilitate the traveling of the chain. Numeral 33 in Figure 6a is another view of one of the rollers.

Figure 7, showing the top of the camera, has two levels at points 39 39. These are for the purpose of keeping the camera level during the taking and developing of the photograph or picture. Numeral 40 shows the appearance of film (#1) when the camera is ready for an exposure.

35 is the driving key which operates the entire mechanism. The key rotates on axle 43 43, which in turn operates the wheels and chains in the camera. When the camera is held in position for a photograph, the key is turned by hand in a counterclock-wise motion. This moves the film along the processes described in Figure 1. By pressing on 36 36 and pulling at bar 32, the top and back of the camera are removed. The dotted line 31 is where the top of the camera snaps into place after the camera has been loaded with film.

Figure 8:
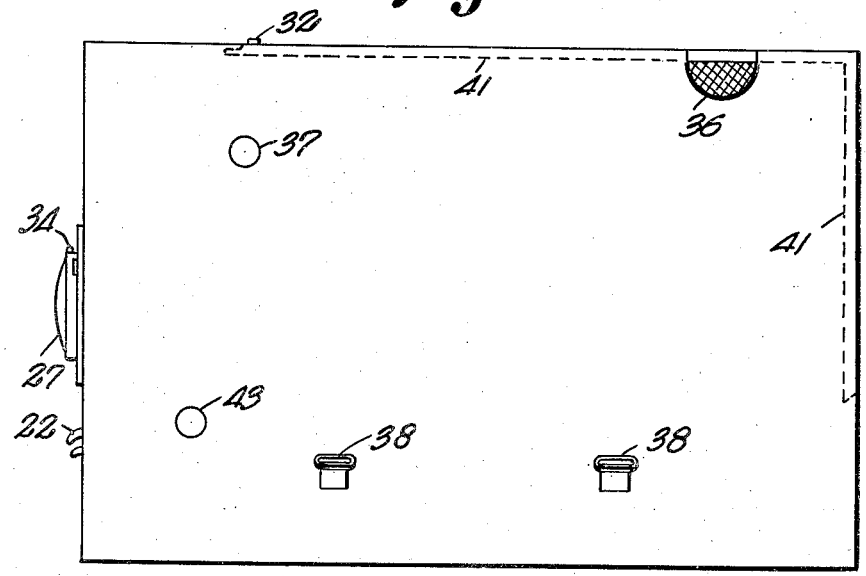
Figure 8 is a left lateral elevational view of the camera as it appears when completed.

Figure 8, which is a left lateral elevational view of the completed camera, shows points 38 38. These are the openings to the two tanks described in Figure 1, as 8 and 16. The solution and water are poured into the camera at these points and enter tanks 8 and 16 respectively. 37 is the axle on which the roll of film rotates and 43 is the axle which is attached to the wheels operating the chains. 43 is in turn operated by key 35. Dotted lines 41 41 show the parts of the camera that are removable when it is to be loaded with film.

Figure 9:
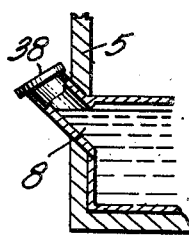
Figure 9 is a cross-section view of a corner of one of the tanks or compartments and the opening thereto.

Figure 9 is a cross-section view of one of the tanks showing the opening where the liquid is poured.

Figure 10 is a right lateral elevational view of the camera. 42 is the thermometer. This reads in seconds instead of degrees and determines the time necessary for the developing of the film. Dotted lines 41 41 show where the removable parts of the camera fit with respect to the camera itself. This figure shows a full view of the driving wheel which operates the mechanism. The key is indicated as 35. 43 is the axle to which it is attached. Key 35 is operated by hand in a counterclock-wise motion. When the next film is ready it will appear at point 40 (see Fig. 7).

Figure 11 is a perspective view of the camera with the top removed. The various parts are distinguished as follows: 35 the driving key; 28 the roll of films, 47 47 the points where the roll of film is attached in the camera; 3 3 the chains; 2 2 the forks which force the films on to the chains; 4 4 the metal groove; 5 5 the sides of the camera; 12 12 small rollers; 13 the large central roller; 9, 14, the tops of the tanks; 27 the lens; and 44 44, 45 45, 46 46, show some of the points where the metal grooves are attached to the sides of the camera.

Figure 12 shows the front of the camera with the two ribs at 23 23, which guide the film out through the lips of the ejector 22 22. 43 is the axle to which both driving wheels are attached.

What I claim is:

1. As a new article of manufacture, a unitary portable hand camera and developing apparatus comprising in combination, a casing having front, rear, side, upper and lower walls, a lens in said front wall, separate closed compartments for liquids adjacent certain of said walls each having entrance and exit slots for the passage of sensitized material into and out of said compartments, filling means for each of said compartments extending through the walls of the casing adjacent to which said compartments are disposed which are accessible outside of said casing, a discharge device in the front wall of the casing provided with a discharge slot, and spaced endless conveyors adjacent said side walls extending adjacent the upper, front and rear walls of said casing and through said compartments.

2. As a new article of manufacture, a unitary portable hand camera and developing apparatus comprising in combination, a casing having front, rear, side, upper and lower walls, a lens in said front wall, separate closed compartments for liquids adjacent certain of said walls each having entrance and exit slots for the passage of sensitized material into and out of said compartments, filling means for each of said compartments extending through the walls of the casing adjacent to which said compartments are disposed which are accessible outside of said casing, a discharge device in the front wall of the casing provided with a discharge slot, spaced endless conveyors adjacent said side walls extending adjacent the upper, front and rear walls of said casing and through said compartments, and a cone-shaped member between the side walls of said casing and the conveyors extending from the said lens towards the said rear wall and having the end spaced therefrom.

3. As a new article of manufacture, a unitary portable hand camera and developing apparatus comprising in combination, a casing including end, side and upper and lower walls, a lens in one of said end walls, a vertical partition extending upwardly from the lower wall forming in conjunction therewith and with the side walls separate compartments for liquid, members spaced above the lower wall having ends spaced from each other and from the end walls to provide entrance and exit openings for said compartments, a discharge device in an end wall provided with a discharge slot, a support for a roll of strip sensitized material, transporting means for said strip including a pair of endless flexible members adjacent said side walls provided with strip engaging parts and supporting means therefor to maintain the said members along the front upper and end walls and along the bottom wall up and over said partition, and means to actuate said flexible members so that they traverse said walls and transport successive portions of a strip to a position behind said lens, in and out of one compartment, up and over said partition, in and out of the other compartment and out the said discharge slot.

4. As a new article of manufacture, a unitary portable hand camera and developing apparatus comprising in combination, a casing having front, rear, upper, lower and side walls, a lens in said front wall, a partition extending upwardly from the lower wall, members spaced from the lower wall cooperating with said partition and walls to provide separate closed compartments having entrance and exit slots at opposite ends thereof, the front wall provided with a discharge slot, endless conveyor chains having means to engage sensitized material, means for supporting said chains along and adjacent the side walls and along the other walls, a support for a roll of strip sensitized material so that it may be unwound by said conveyor chains, means to move said chains simultaneously, all adapted and arranged whereby successive portions of a strip are presented adjacent the rear wall and behind said lens and passed successively into and through said compartments and the leading end of a strip is passed outwardly through said discharge slot, and a member adjacent the entrance of said slot extending between said conveyors to engage and direct the leading edge of a strip into said slot.

5. As a new article of manufacture, a unitary portable hand camera and developing apparatus comprising in combination, a casing having front, rear, upper, lower and side walls, a lens in said front wall, a partition extending upwardly from the lower wall, members spaced from the lower wall cooperating with said partition and walls to provide separate closed compartments having entrance and exit slots at opposite ends thereof, the front wall provided with a discharge slot, endless conveyor chains having means to engage sensitized material, means for supporting said chains along and adjacent the side walls and along the other walls, a support for a roll of strip sensitized material so that it may be unwound by said conveyor chains, means to move said chains simultaneously, all adapted and arranged whereby successive portions of a strip are presented adjacent the rear wall and behind said lens and passed successively into and through said compartments and the leading end of a strip is passed outwardly through said discharge slot, a member adjacent the entrance of said slot extending between said conveyors to engage and direct the leading edge of a strip into said slot, and a member adjacent the exit of said slot against which a strip may be engaged for tearing the same.

6. As a new article of manufacture, a unitary portable hand camera and developing apparatus comprising in combination, a casing including end, side and upper and lower walls, a lens in one of said end walls, a vertical partition extending upwardly from the lower wall forming in conjunction therewith and with the side walls separate compartments for liquid, members spaced above the lower wall having ends spaced from each other and from the end walls to provide entrance and exit openings for said compartments, a discharge device in an end wall provided with a discharge slot, a support for a roll of strip sensitized material, transporting means for said strip including separate members adjacent said side walls provided with strip engaging parts and supporting means therefor to maintain the said members along the front, upper and end walls and along the bottom wall up and over said partition, and means to actuate said members so that they traverse said walls and transport successive portions of a strip to a position behind said lens, in and out of one compartment, up and over said partition, in and out of the other compartment and out the said discharge slot.

7. As a new article of manufacture, a unitary portable hand camera and developing apparatus comprising in combination, a casing having front, rear, upper, lower and side walls, a lens in said front wall, a partition extending upwardly from the lower wall, members spaced from the lower wall cooperating with said partition and walls to provide separate closed compartments having entrance and exit slots at opposite ends thereof, the front wall provided with a discharge slot, endless conveyor chains having means to engage sensitized material, means for supporting said chains along and adjacent the side walls and along the other walls, a support for a roll of strip sensitized material so that it may be unwound by said conveyor chains, means to move said chains simultaneously, all adapted and arranged whereby successive portions of a strip are presented adjacent the rear wall and behind said lens and passed successively into and through said compartments and the leading end of a strip is passed outwardly through said discharge slot, a member adjacent the entrance of said slot extending between said conveyors to engage and direct the leading edge of a strip into said slot, and means exteriorly of the casing operatively connected to said conveyor chains.

8. As a new article of manufacture, a unitary portable hand camera and developing apparatus comprising in combination, a casing including, front, rear, side and upper and lower walls, a lens in the front wall, a partition extending upwardly from the lower wall forming therewith and with the side, front and rear walls separate compartments for liquid, a support for a roll of sensitized material adjacent the upper wall, rotatable driving means for conveyors adjacent the forward wall, guides for conveyors at the jointure of the rear and side walls, endless flexible conveyors engaged by said driving means and extending along the side and rear walls having means for engaging a strip of sensitized material carried by said support, the front wall having a discharge slot for the leading end of said strip of sensitized material, and means for actuating said driving means, all adapted and arranged whereby successive portions of a sensitized strip of material may be transported along said rear wall rearwardly of said lens, and into and out of said compartments and through said discharge slot.

9. As a new article of manufacture, a unitary portable hand camera and developing apparatus comprising in combination, a casing including, front, rear, side and upper and lower walls, a lens in the front wall, a partition extending upwardly from the lower wall forming therewith and with the side, front and rear walls separate compartments for liquid, a support for a roll of sensitized material adjacent the upper wall, rotatable driving means for conveyors adjacent the forward wall, guides for conveyors at the jointure of the rear and side walls, endless flexible conveyors engaged by said driving means and extending along the side and rear walls having means for engaging a strip of sensitized material carried by said support, the front wall having a discharge slot for the leading end of said strip of sensitized material, and means for actuating said driving means, all adapted and arranged whereby successive portions of a sensitized strip of material may be transported along said rear wall rearwardly of said lens, and into and out of said compartments and through said discharge slot, the said flexible members including chains and the said driving means including toothed members.

10. As a new article of manufacture, a unitary portable hand camera and developing apparatus comprising in combination, a casing including end, side, upper and lower walls, a lens in one of said end walls, separate compartments for liquid disposed to one of said end walls with entrance and exit openings for said compartments, a discharge device in an end wall provided with a discharge slot, a support for a roll of strip sensitized material, a transporting means for the strip including a pair of endless flexible members adjacent said side walls provided with strip engaging parts and supporting means therefor to guide the members along the said walls, and means to actuate the flexible members so that they traverse said walls and transport successive portions of a strip to a position behind said lens, in and out of one compartment, up and over said partition, in and out of the other compartment and out the said discharge slot.

MICHAEL W. ALBANO.